(12) United States Patent
Son et al.

(10) Patent No.: US 11,498,516 B2
(45) Date of Patent: Nov. 15, 2022

(54) LOCKING APPARATUS OF SEAT BELT BUCKLE FOR VEHICLE

(71) Applicants: HYUNDAI MOTOR COMPANY, Seoul (KR); KIA MOTORS CORPORATION, Seoul (KR); DAEWON Precision Industrial Co., LTD., Ansan-si (KR)

(72) Inventors: Byeong Seon Son, Seoul (KR); Tae Hoon Lee, Suwon-si (KR); Sang Ho Kim, Incheon (KR); Ji Hwan Kim, Seoul (KR); Sang Hoon Park, Incheon (KR); Seon Chae Na, Yongin-si (KR); Byoung Tae Seo, Cheonan-si (KR)

(73) Assignees: HYUNDAI MOTOR COMPANY, Seoul (KR); KIA MOTORS CORPORATION, Seoul (KR); DAEWON PRECISION INDUSTRIAL CO., LTD., Ansan (KR)

( * ) Notice: Subject to any disclaimer, the term of this patent is extended or adjusted under 35 U.S.C. 154(b) by 0 days.

(21) Appl. No.: 17/182,619

(22) Filed: Feb. 23, 2021

(65) Prior Publication Data
US 2022/0063552 A1 Mar. 3, 2022

(30) Foreign Application Priority Data
Sep. 3, 2020 (KR) .......................... 10-2020-0112254

(51) Int. Cl.
*B60N 2/16* (2006.01)
*B60R 22/20* (2006.01)
(Continued)

(52) U.S. Cl.
CPC ............ *B60R 22/20* (2013.01); *B60R 22/195* (2013.01); *B60R 22/26* (2013.01); *B60N 2/1615* (2013.01); *B60R 2022/1806* (2013.01)

(58) Field of Classification Search
CPC ....... B60R 22/195; B60R 22/20; B60R 22/26; B60R 2022/1806; B60N 2/1615
(Continued)

(56) References Cited

U.S. PATENT DOCUMENTS 4,790,597 A * 12/1988 Bauer ..................... B60R 22/26
                                                    280/801.1
5,882,061 A *  3/1999 Guillouet ................. B60N 2/43
                                                    297/344.15 X
(Continued)

FOREIGN PATENT DOCUMENTS

JP    2006-182143 A    7/2006
JP    2011-016482 A    1/2011
(Continued)

*Primary Examiner* — Rodney B White
(74) *Attorney, Agent, or Firm* — Morgan, Lewis & Bockius LLP (57) ABSTRACT

A locking apparatus of a buckle of a seat belt for vehicles includes a sector gear bracket configured to be integrally coupled to a rear pipe which is coupled to a seat cushion frame, wherein the sector gear bracket has: an arc-shaped locking hole; and a sector gear arranged along the locking hole as an internal gear; a pole bracket located at one side of the sector gear bracket, wherein the pole bracket has a shaft part which is configured to pass through the locking hole and the seat cushion frame and then be integrally coupled to a lower end of the buckle; and a lock gear arranged on the pole bracket as an external gear.

8 Claims, 8 Drawing Sheets

(51) Int. Cl.
  *B60R 22/26* (2006.01)
  *B60R 22/195* (2006.01)
  *B60R 22/18* (2006.01)

(58) Field of Classification Search
  USPC ................................ 297/344.17, 344.15
  See application file for complete search history.

(56) References Cited

U.S. PATENT DOCUMENTS

| | | | | |
|---|---|---|---|---|
| 6,116,689 A * | 9/2000 | Bauer | .................. | B60R 22/26 297/344.15 X |
| 6,264,275 B1 * | 7/2001 | Frohnhaus | ............. | B60N 2/165 297/344.15 X |
| 6,347,778 B1 * | 2/2002 | Koga | .................. | B60N 2/164 297/344.17 X |
| 6,464,193 B1 * | 10/2002 | Nemoto | ................ | B60N 2/168 297/344.15 X |
| 6,467,849 B1 * | 10/2002 | Deptolla | ................ | B60R 22/26 297/344.15 X |
| 6,502,799 B2 * | 1/2003 | Lepaule | ................ | B60N 2/165 296/65.05 |
| 6,572,065 B2 * | 6/2003 | Koga | .................. | B60N 2/1615 297/344.17 X |
| 6,659,548 B2 * | 12/2003 | Becker | ................... | B60R 22/26 297/479 |
| 6,755,469 B2 * | 6/2004 | Akaike | ................ | B60N 2/1615 297/344.15 X |
| 6,843,460 B2 * | 1/2005 | Koga | .................. | B60N 2/067 297/344.15 X |
| 6,902,234 B2 * | 6/2005 | Becker | .................. | B60N 2/165 297/344.15 X |
| 7,036,878 B2 * | 5/2006 | Masutani | ................ | B60N 2/43 297/468 |
| 7,044,543 B2 * | 5/2006 | Schumann | ........... | B60N 2/4214 297/216.19 |
| 7,517,020 B2 * | 4/2009 | Yokota | .................... | B60N 2/43 297/344.15 X |
| 8,414,055 B2 * | 4/2013 | Kanda | .................. | B60N 2/4249 296/65.09 |
| 8,807,507 B2 * | 8/2014 | Ito | ......................... | B60N 2/169 297/344.15 X |
| 8,998,325 B2 * | 4/2015 | Jonsson | ............. | B60N 2/42709 297/344.15 X |
| 10,239,422 B2 * | 3/2019 | Schulz | ................... | B60N 2/165 |
| 10,358,052 B1 * | 7/2019 | Mizukoshi | ............ | B60N 2/1615 |
| 10,569,670 B2 * | 2/2020 | Mizukoshi | ........... | B60N 2/1615 |
| 2006/0061176 A1 * | 3/2006 | Sakai | .................... | B60R 22/26 297/344.15 |
| 2018/0339610 A1 * | 11/2018 | Suzuki | ................ | B60N 2/1615 |
| 2019/0070982 A1 * | 3/2019 | Kajino | ................ | B60N 2/1615 |

FOREIGN PATENT DOCUMENTS

| | | |
|---|---|---|
| KR | 10-2013-0047014 A | 5/2013 |
| KR | 10-2020-0049060 A | 5/2020 |

* cited by examiner

LOCKING APPARATUS OF SEAT BELT BUCKLE FOR VEHICLE

CROSS-REFERENCE TO RELATED APPLICATION

This application claims the benefit of priority to Korean Patent Application No. 10-2020-0112254, filed on Sep. 3, 2020, in the Korean Intellectual Property Office, the disclosure of which is incorporated herein by reference in its entirety.

TECHNICAL FIELD

The present disclosure relates to a locking apparatus of a buckle of a seat belt for vehicles, and more particularly, to a locking apparatus of a buckle of a seat belt for vehicles which may couple the buckle to a seat cushion frame so as to be interlocked with adjustment of the height of a seat, to exhibit supporting force with respect to pulling in a direction in which a load is applied to the buckle when a collision occurs, and to distribute the load applied to the buckle towards a vehicle body through a seat rail.

BACKGROUND

In general, seat belts which confine passenger's upper bodies in the event of an accident to secure safety of the passengers are installed in a vehicle, and each seat belt is configured such that a passenger wears the seat belt by coupling a tongue buckle provided on webbing to a buckle connected to a vehicle body.

A seat for vehicles includes a seat frame serving as a frame, and including a seat cushion frame and a seat back frame which is installed in a manner of being connected to a seat rail.

When the seat for vehicles has a structure, the height of which is adjustable vertically, the seat cushion frame and the seat rail are connected by rotatable links, and thus, the seat cushion frame is moved vertically through rotation of the rotatable links so that the height of the seat is adjustable.

When a collision occurs in the state in which a vehicle passenger is wearing the seat belt, the passenger's upper body is rapidly moved towards the front portion of the vehicle by inertial force, and the lower end of the buckle is coupled to the seat rail and thus bears the load applied to the seat belt.

However, in the conventional structure in which the lower end of the buckle is coupled to the seat rail, when the seat is raised to adjust the height thereof, the buckle is hidden by a seat cushion, and thus, the passenger is inconvenienced when coupling the buckle tongue to the buckle.

The above description has been provided to aid in understanding of the background of the present disclosure and should not be interpreted as conventional technology known to those skilled in the art.

SUMMARY

The present disclosure has been made in view of the above problems, and it is an object of the present disclosure to provide a locking apparatus of a buckle of a seat belt for vehicles which may couple the buckle to a seat cushion frame and connect the buckle to a seat rail so as to be moved vertically together with a seat when the height of the seat is adjusted, to exhibit supporting force with respect to pulling in a direction in which a load is applied to the buckle when a collision occurs, and to distribute the load applied to the buckle towards a vehicle body through the seat rail, thereby being capable of improving durability of the buckle.

In accordance with the present disclosure, the above and other objects can be accomplished by the provision of a locking apparatus of a buckle of a seat belt for vehicles, including: a sector gear bracket configured to be integrally coupled to a rear pipe coupled to a seat cushion frame, wherein the sector gear bracket has an arc-shaped locking hole and a sector gear arranged along the locking hole as an internal gear; a pole bracket located at one side of the sector gear bracket and configured to have a shaft part passing through the locking hole and the seat cushion frame and then integrally coupled to the lower end of the buckle; and a lock gear arranged on the pole bracket as an external gear, located in the locking hole when the shaft part is coupled to the buckle, and moved in the locking hole in a diagonal direction due to a load applied to the buckle so as to be engaged with or disengaged from the sector gear.

A patch bracket may be fixedly coupled to one surface of the seat cushion frame configured to face the sector gear bracket, and a guide hole configured such that the shaft part passes through the guide hole may be formed integrally through the seat cushion frame and the patch bracket.

The guide hole may be formed to have a shape of a slit oriented in a diagonal direction in which the load is applied to the buckle.

The lock gear may be engaged with the sector gear when the shaft part is moved upwards along the guide hole due to the load applied to the buckle, and the lock gear may be disengaged from the sector gear when the shaft part is moved downwards along the guide hole.

The front end of the sector gear bracket may be rotatably coupled to a rail bracket by a hinge pin, the rail bracket may be fixedly coupled to a seat rail, and when a collision occurs, the load applied to the buckle may be transmitted to a vehicle body through the sector gear bracket, the hinge pin, the rail bracket and the seat rail so as to be distributed.

The seat cushion frame and the seat rail may be connected by a plurality of rotatable links, when the seat cushion frame and the rear pipe are vertically moved with respect to the seat rail, the seat cushion frame may be vertically moved due to rotation of the rotatable links so that a height of the seat cushion frame is adjusted, and when the seat cushion frame is vertically moved, the buckle connected to the seat cushion frame may be vertically moved together with the seat cushion frame.

When the lower end of the buckle and the shaft part of the pole bracket are coupled to each other, a spring bracket may be integrally coupled thereto, the locking apparatus may further include a return spring installed such that one end of the return spring is supported by the spring bracket and a remaining end of the return spring is supported by the seat cushion frame, and the return spring may provide spring force to the spring bracket to space the lock gear apart from the sector gear so as to release engagement between the lock gear and the sector gear.

A bolt part configured to protrude towards the pole bracket may be formed on the patch bracket, a bracket hole, through which the bolt part passes, may be formed in the pole bracket in the same diagonal direction as the guide hole, and as a pole nut is coupled to the bolt part having passed through the bracket hole, torsion of the pole bracket may be prevented when the shaft part is moved along the guide hole by the load applied to the buckle.

The buckle configured to constitute the seat belt may be connected to the seat cushion frame and the seat rail by the locking apparatus.

BRIEF DESCRIPTION OF THE DRAWINGS

The above and other objects, features and other advantages of the present disclosure will be more clearly understood from the following detailed description taken in conjunction with the accompanying drawings, in which:

FIG. 1(A) illustrates the state in which the seat is lowered and FIG. 1(B) illustrates the state in which the seat is raised;

DETAILED DESCRIPTION OF THE EXEMPLARY EMBODIMENTS

Specific structural or functional descriptions in embodiments of the present disclosure set forth in the description which follows will be exemplarily given to describe the embodiments of the present disclosure. However, the present disclosure may be embodied in many alternative forms, and should not be construed as being limited to the embodiments set forth herein.

The embodiments of the present disclosure may be variously modified and changed, and thus specific embodiments of the present disclosure will be illustrated in the drawings and described in detail in the following description of the embodiments of the present disclosure. However, it will be understood that the embodiments of the present disclosure are provided only to completely disclose to the disclosure and cover modifications, equivalents or alternatives which come within the scope and technical range of the disclosure.

In the following description of the embodiments, terms, such as "first" and "second", are used only to describe various elements, and these elements should not be construed to be limited by these terms. These terms are used only to distinguish one element from other elements. For example, a first element described hereinafter may be termed a second element, and similarly, a second element described hereinafter may be termed a first element, without departing from the scope of the disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

The terminology used herein is for the purpose of describing particular embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless defined otherwise, all terms including technical and scientific terms used in the following description have the same meanings as those of terms generally understood by those in the skill in the art. Terms defined in generally used dictionaries will be interpreted as having meanings coinciding with contextual meanings in the related technology, and are not to be interpreted as having ideal or excessively formal meanings unless defined clearly in the description.

A controller according to one exemplary embodiment of the present disclosure may be implemented through an algorithm configured to control the operation of various components of a vehicle or a nonvolatile memories (not shown) configured to store data regarding a software command to reproduce the algorithm and a processor (not shown) configured to perform operations which will be described below using the data stored in the corresponding memory. Here, the memory and the processor may be implemented as individual chips. Alternatively, the memory and processor may be implemented as a single integrated chip. Alternatively, more than one processor may be provided.

Hereinafter, a locking apparatus of a buckle of a seat belt for vehicles according to one exemplary embodiment of the present disclosure will be described with reference to the accompanying drawings.

Figure 1A:
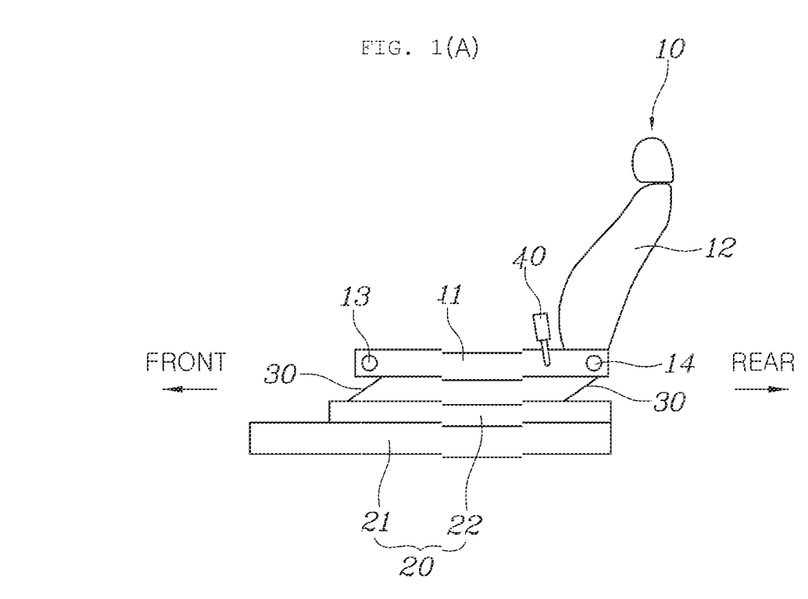
FIGS. 1(A) and 1(B) are views illustrating the state in which a buckle of a seat belt is coupled to a seat cushion bracket by a locking apparatus in the structure of a seat, the height of which is adjustable, according to the present disclosure, and more particularly.
Figure 1B:
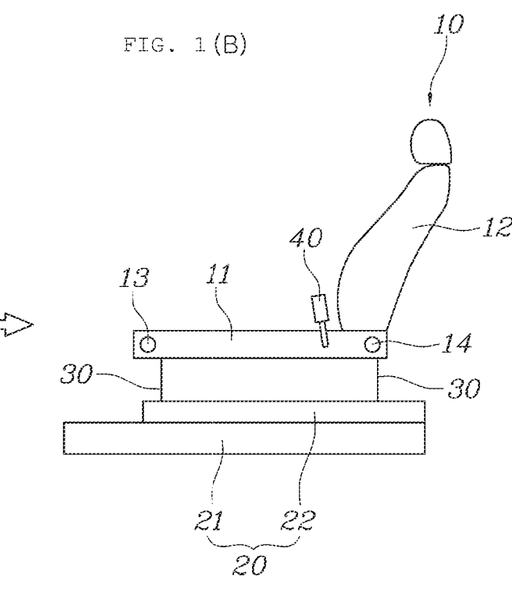

A seat for vehicles includes, as shown in FIGS. 1(A) and 1(B), a seat frame 10 serving as a frame, the seat frame 10 includes a seat cushion frame 11 and a seat back frame 12, and the seat back frame 12 exhibits a reclining function in which the seat back frame 12 is rotated forwards and backwards with respect to the seat cushion frame 11 so as to adjust the angle thereof.

A front pipe 13 and a rear pipe 14 are coupled to the front end and the rear end of the seat cushion frame 11 so as to constrain portions of the front end and the rear end of the seat cushion frame 11 of a vehicle, which are spaced apart from each other laterally.

A stationary rail 21 constituting a seat rail 20 is fixed to the floor panel of the vehicle so as to extend in the forward and backward directions, a movable rail 22 which is moved forwards and backwards along the stationary rail 21 is coupled to the stationary rail 21, and the movable rail 22 is rotatably connected to the seat cushion frame 11 by a plurality of rotatable links 30.

Therefore, when the rotatable links 30 are rotated by external power, the seat cushion frame 11 is vertically moved with respect to the seat rail 20, and thereby, the height of the seat of the vehicle may be adjusted in the vertical direction.

FIG. 1(A) illustrates a down state in which the seat frame 10 is lowered, and FIG. 1(B) illustrates an up state in which the seat frame 10 is raised.

One embodiment of the present disclosure is configured such that a buckle 40 constituting the seat belt is located on the side surface of the seat cushion frame 11 and is coupled to the seat cushion frame 11, and thereby, when the height of the seat is adjusted, the buckle 40 is moved together with the seat, and is consequently prevented from being hidden by a seat cushion, thereby being capable of alleviating inconvenience when a passenger couples a buckle tongue to the buckle 40.

Further, when a collision occurs in the state in which the vehicle passenger is wearing the seat belt, the passenger's upper body is rapidly moved towards the front portion of the vehicle by inertial force and, at this time, a great load (pulling force of webbing) is applied to the buckle 40, and, in one embodiment of the present disclosure, supporting force with respect to pulling in a direction in which the load is applied to the buckle 40 is exhibited through the engagement structure of gears, thus being capable of maintaining the firm coupling structure of the buckle 40 and improving durability of the buckle 40 thereby.

In addition, one embodiment of the present disclosure is configured such that the buckle 40 is coupled to the seat cushion frame 11 and is also connected to the seat rail 20, thus being capable of distributing the load applied to the buckle 40 towards a vehicle body through the seat rail 20 when a collision occurs and improving durability of the buckle 40 thereby.

In order to realize the above effects, the locking apparatus according to one exemplary embodiment of the present disclosure includes, as shown in FIGS. 1(A), 1(B), 2, 3, 4, 5, to 6, a sector gear bracket 100 configured to be integrally coupled to the rear pipe 14 coupled to the seat cushion frame 11 such that the rear pipe 14 passes through the sector gear bracket 100, and to have an arc-shaped locking hole 110 formed therein and a sector gear 120 provided in the form of an internal gear formed along the outer circumference of the locking hole 110, a pole bracket 200 located at one side of the sector gear bracket 100 and configured to have a shaft part 210 passing through the locking hole 110 and the seat cushion frame 11 and then integrally coupled to the lower end of the buckle 40, and a lock gear 300 provided in the form of an external gear on one surface of the pole bracket 200, from which the shaft part 210 protrudes, located in the locking hole 110 when the shaft part 210 is coupled to the buckle 40, and moved in the locking hole 110 in a diagonal direction due to the load applied to the buckle 40 so as to be engaged with or disengaged from the sector gear 120.

Figure 2:
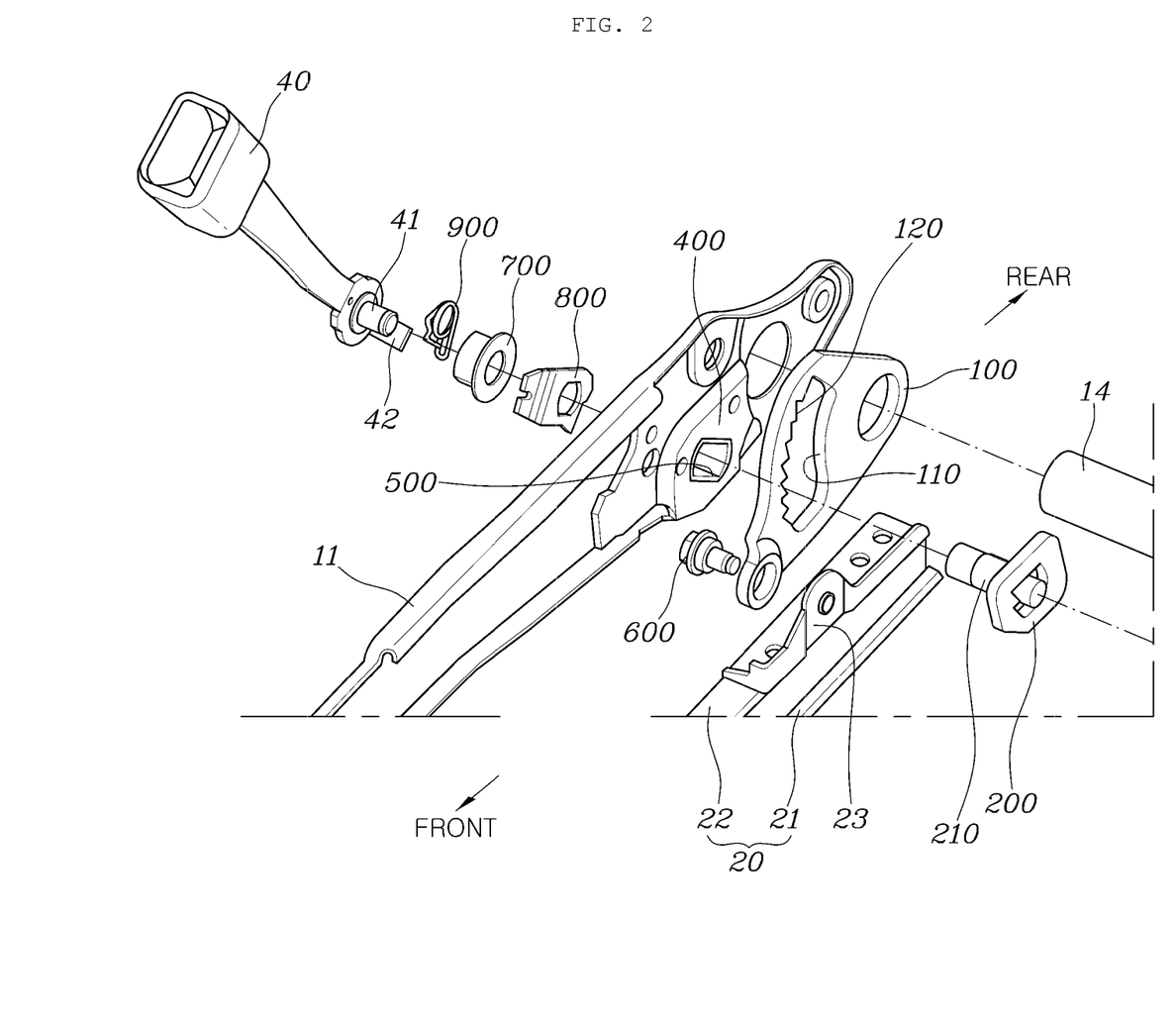
FIG. 2 is an exploded perspective view of the locking apparatus of the buckle of the seat belt according to the present disclosure.

The rear pipe 14 sequentially passes through the sector gear bracket 100 and the seat cushion frame 11, and the rear pipe 14 is coupled to each of the sector gear bracket 100 and the seat cushion frame 11 by welding so as to be integrated with the sector gear bracket 100 and the seat cushion frame 11.

A patch bracket 400 is fixedly coupled to one surface of the seat cushion frame 11, facing the sector gear bracket 100, by welding, and a guide hole 500 is formed integrally through the seat cushion frame 11 and the patch bracket 400.

A bush may be inserted into the guide hole 500, and the shaft part 210 of the pole bracket 200 may pass through the guide hole 500.

Figure 6:
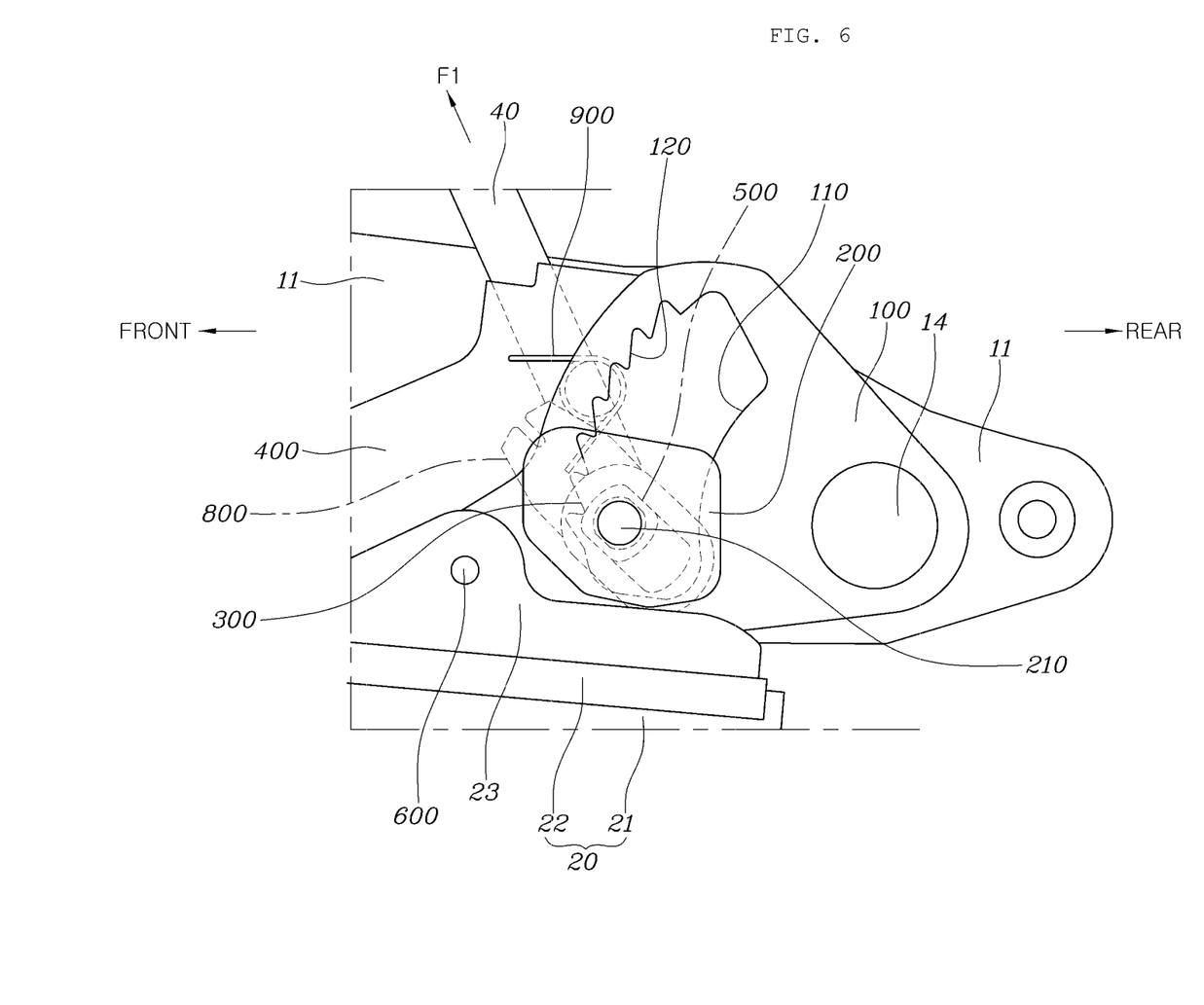
FIG. 6 is a view illustrating the state in which the lock gear is engaged with the sector gear by moving a pole bracket in a direction in which a load is applied to the buckle in the event of a collision.

The guide hole 500 may have the shape of a slit oriented in the diagonal direction in which the load is applied to the buckle 40 (shown by arrow F1 in FIG. 6).

The front end of the sector gear bracket 100 is rotatably coupled to a rail bracket 23 by a hinge pin 600, and the rail bracket 23 is fixedly coupled to the movable rail 22 of the seat rail 20.

When the rotatable links 30 are rotated and the rear pipe 14 is moved upwards and downwards so as to adjust the height of the seat, the sector gear bracket 100 is rotated with respect to the rail bracket 23 about the hinge pin 600.

A buckle shaft 41 protrudes from the lower end of the buckle 40, and the buckle shaft 41 is formed in the structure of a bolt having a screw thread formed on the outer circumferential surface thereof.

The shaft part 210 of the pole bracket 200 is formed in the structure of a pipe, and screw threads extending in the length direction of the shaft part 210 are formed on both the inner circumferential surface and the outer circumferential surface of the shaft part 210.

Figure 3:
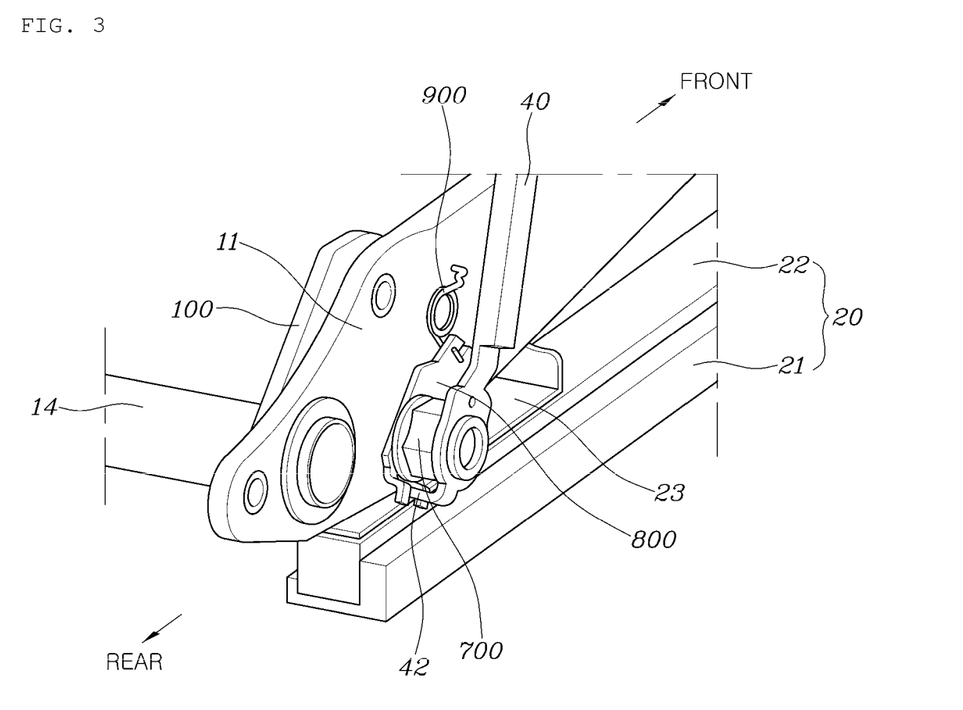
FIG. 3 is a perspective view of the locking apparatus of FIG. 2 in an assembled state.
Figure 4:
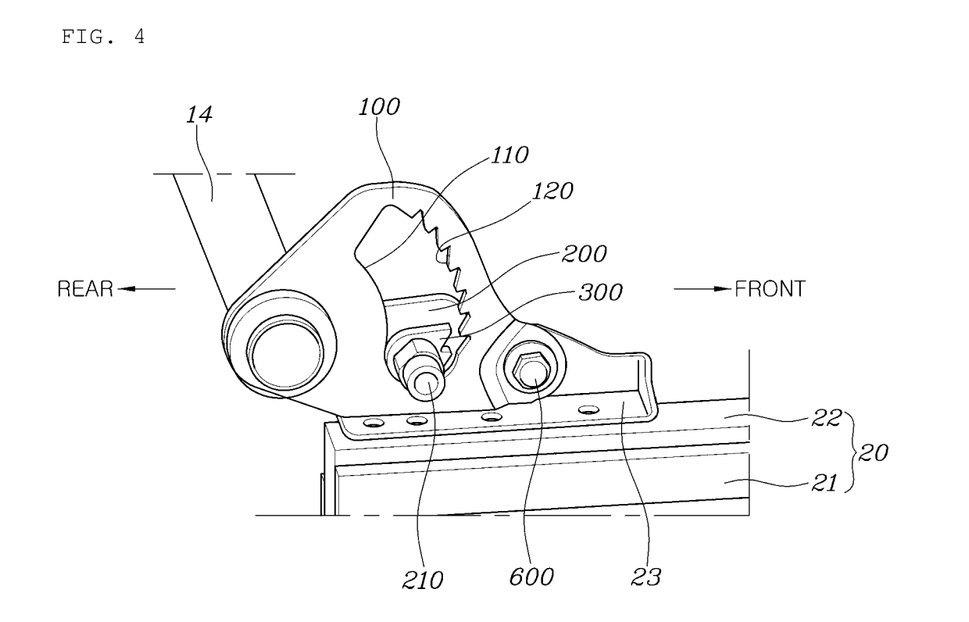
FIG. 4 is a view illustrating a sector gear and a lock gear according to the present disclosure.

The buckle shaft 41 of the buckle 40 passes through a buckle nut 700, the shaft part 210 of the pole bracket 200 passed through the locking hole 110 of the sector gear bracket 100 and the guide hole 500, the buckle shaft 41 is inserted into the shaft part 210 and is coupled to the shaft part 210 through threaded engagement, the shaft part 210 is inserted into the buckle nut 700 and is coupled to the buckle nut 700 through threaded engagement, and thereby, the buckle 40, the pole bracket 200, and the lock gear 300 provided on the pole bracket 200 are coupled to each other to form one integral body.

Further, in the present disclosure, when the buckle shaft 41 of the buckle 40 and the shaft part 210 of the pole bracket 200 are coupled to each other, a spring bracket 800 is integrally coupled thereto, and the locking apparatus according to the present disclosure further includes a return spring 900 installed such that one end of the return spring 900 is supported by the spring bracket 800 and the other end of the return spring 900 is supported by the seat cushion frame 11.

The shaft part 210 of the pole bracket 200 having passed through the guide hole 500 passes through the spring bracket 800 and is coupled to the buckle shaft 41 and the buckle nut 700 through threaded engagement, and in this case, the spring bracket 800 contacts a protrusion 42 protruding from the lower portion of the buckle shaft 41, and thereby, the buckle 40 and the spring bracket 800 are coupled to each other to form one integral body.

Finally, the buckle 40, the return spring 900, the buckle nut 700, the spring bracket 800, the pole bracket 200 and the lock gear 300 are integrally coupled to each other to form one integral body, and therefore, when the buckle 40 is moved by the load applied to the buckle 40, all of the return spring 900, the buckle nut 700, the spring bracket 800, the pole bracket 200 and the lock gear 300 are moved together.

Figure 5:
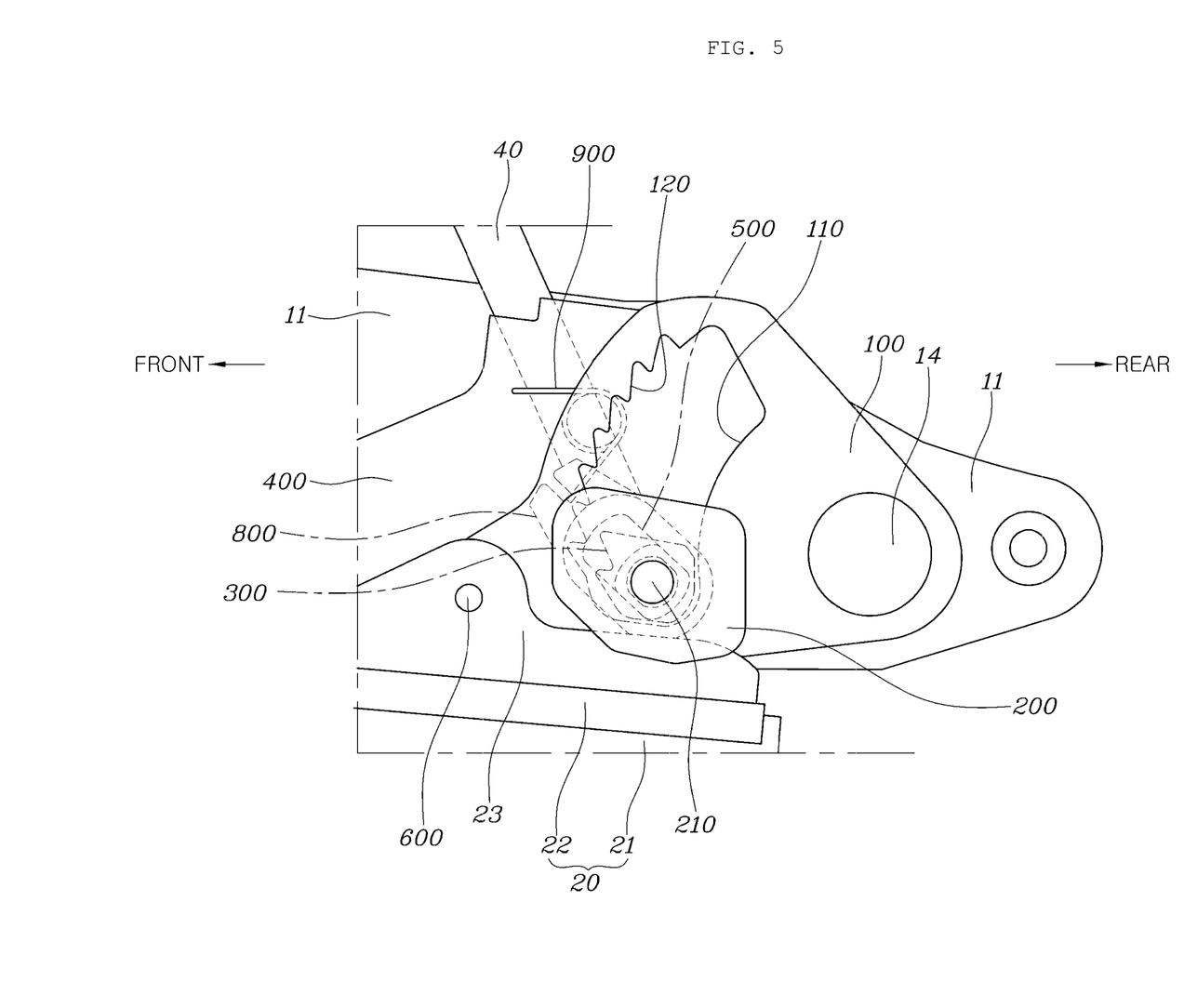
FIG. 5 is a view illustrating the state in which the lock gear is spaced apart from the sector gear by the spring force of a return spring according to the present disclosure.

Because the elastic force of the return spring 900 is transmitted into the spring bracket 800, and the spring bracket 800 is integrally coupled to the buckle 40 and the lock gear 300 provided on the pole bracket 200, the lock gear 300 fundamentally maintains the state in which engagement between the lock gear 300 and the sector gear 120 is released using the elastic force of the return spring 900, as shown in FIG. 5.

Figure 7:
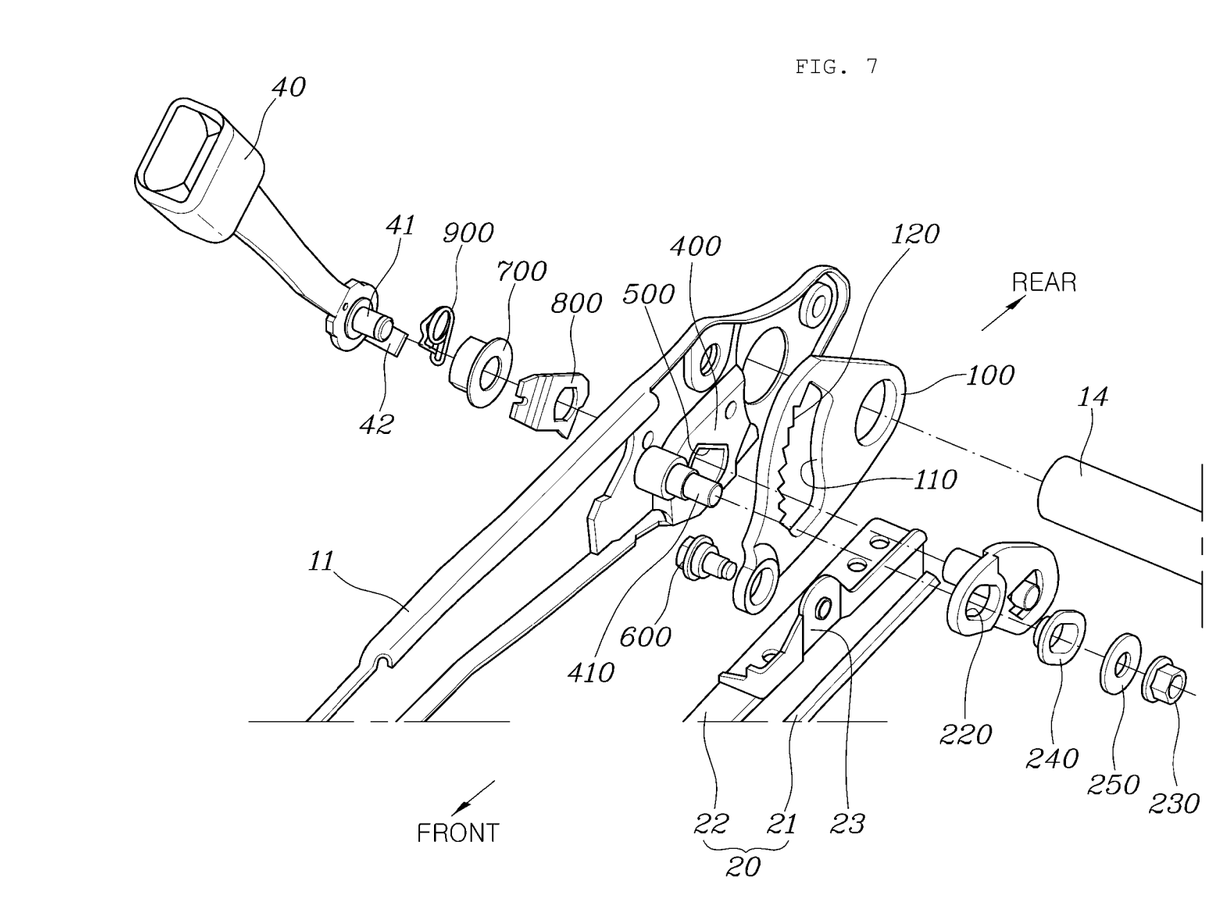
FIGS. 7 and 8 are an exploded perspective view and a perspective view illustrating the state in which a bolt part formed on a patch bracket is coupled to a pole nut after passing through a bracket hole formed in the pole bracket according to the present disclosure.
Figure 8:
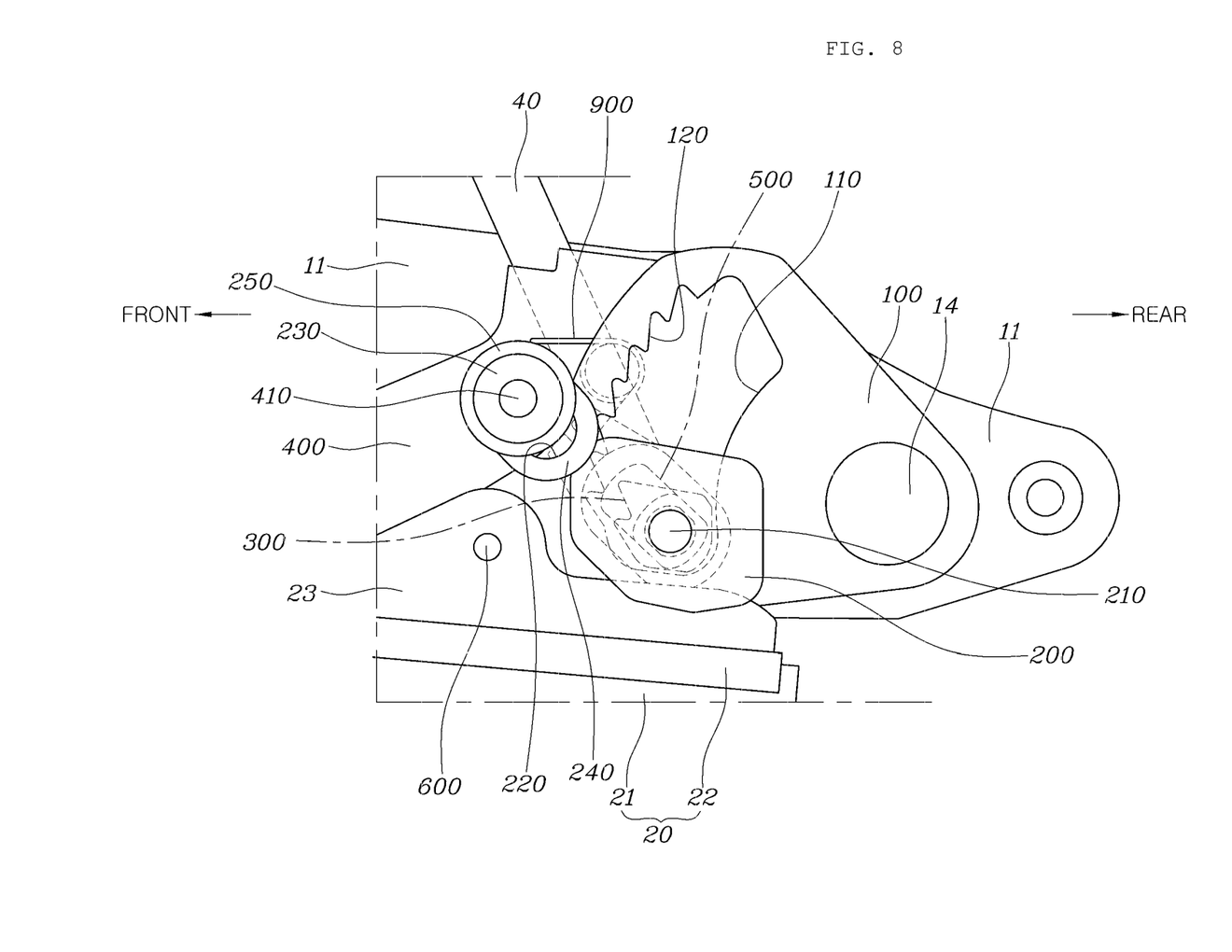

FIGS. 7 and 8 illustrates another embodiment of the coupling structure between the pole bracket 200 and the patch bracket 400 according to the present disclosure, i.e., a structure in which a bolt part 410 protruding towards the pole bracket 200 is formed on the patch bracket 400, a bracket hole 220 through which the bolt part 410 passes is formed in the same diagonal direction as the guide hole 500 in the pole bracket 200, a pole nut 230 is coupled to the bolt part 410 having passed through the bracket hole 220, and thereby, torsion of the pole bracket 200 may be prevented when the shaft part 210 is moved along the guide hole 500 by the load (shown by arrow F1) applied to the buckle 40.

A bush 240 may be inserted into the bracket hole 220 of the pole bracket 200, and the pole nut 230 together with a washer 250 may be coupled to the bracket hole 220.

As described above, the locking apparatus according to the present disclosure is configured such that the buckle 40 constituting the seat belt is located on the side surface of the seat cushion frame 11 and is coupled to the seat cushion frame 11, and thus, when the seat cushion frame 11 is vertically moved so as to adjust the height of the seat, the buckle 40 is also moved, thereby being capable of preventing the buckle 40 from being hidden by the seat cushion regardless of the adjusted height of the seat and thus allowing a passenger to easily coupling the buckle tongue to the buckle 40.

Further, when a collision occurs in the state in which a vehicle passenger is wearing the seat belt, the passenger's upper body is rapidly moved towards the front portion of the vehicle by inertial force, and at this time, the passenger's upper body pulls the webbing of the seat belt and a great load is applied to the buckle 40 by the pulling force of the webbing (shown by arrow F1 in FIG. 6).

When the load (shown by arrow F1) is applied to the buckle 40, as shown in FIG. 6, the shaft part 210 of the pole bracket 200 connected to the buckle 40 is moved to the upper portion of the guide hole 500 close to the sector gear 120 (i.e., is moved in the direction in which the load is applied to the buckle 40), and the lock gear 300 provided on the pole bracket 200 is engaged with the sector gear 120 due to the upward movement of the pole bracket 200 and thus exhibits supporting force, thereby being capable of maintaining the firm coupling structure of the buckle 40 and improving durability of the buckle 40.

Thereafter, when the load applied to the buckle 40 is removed, the shaft part 210 of the pole bracket 200 is moved downwards in the guide hole 500 and thus is moved away from the sector gear 120 by the elastic force of the return spring 900, and the lock gear 300 is disengaged from the sector gear 120 due to the downward movement of the pole bracket 200, as shown in FIG. 5.

In addition, according to one embodiment of the present disclosure, the buckle 40 is connected to the seat cushion frame 11, the seat cushion frame 11 is connected to the sector gear bracket 100 by the rear pipe 14, the sector gear bracket 100 is connected to the seat rail 20 by the hinge pin 600 and the rail bracket 23, and thus when a collision occurs and thus a great load is applied to the buckle 40 (in the direction F1) due to the pulling force of the webbing, the load applied to the buckle 40 (in the direction F1) may ultimately be distributed towards the vehicle body through the seat rail 20, thereby improving durability of the buckle 40.

As is apparent from the above description, a locking apparatus of a buckle of a seat belt for vehicles according to the present disclosure is configured such that the buckle constituting the seat belt is located on the side surface of a seat cushion frame and is coupled to the seat cushion frame, and thus, when the seat cushion frame is vertically moved so as to adjust the height of a seat, the buckle is also moved, thereby being capable of preventing the buckle from being hidden by a seat cushion regardless of the adjusted height of the seat and thus allowing a passenger to easily couple a buckle tongue to the buckle.

Further, when a collision occurs in the state in which a vehicle passenger is wearing the seat belt, and thus a great load is applied to the buckle due to pulling of webbing of the seat belt, a shaft part of a pole bracket connected to the buckle is moved to the upper portion of a guide hole close to a sector gear, and a lock gear provided on the pole bracket is engaged with the sector gear due to the upward movement of the pole bracket and thus exhibits supporting force, thereby being capable of maintaining the firm coupling structure of the buckle and improving durability of the buckle.

In addition, according to one embodiment of the present disclosure, the buckle is connected to the seat cushion frame, the seat cushion frame is connected to a sector gear bracket by a rear pipe, the sector gear bracket is connected to a seat rail by a hinge pin and a rail bracket, and thus, when a collision occurs and thus a great load is applied to the buckle, the load applied to the buckle may ultimately be distributed towards the vehicle body through the seat rail, thereby being capable of improving durability of the buckle.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A locking apparatus of a buckle of a seat belt for vehicles, comprising:
   a sector gear bracket configured to be integrally coupled to a rear pipe which is coupled to a seat cushion frame, wherein the sector gear bracket has:
      an arc-shaped locking hole; and
      a sector gear arranged along the locking hole as an internal gear;
   a pole bracket located at one side of the sector gear bracket, wherein the pole bracket has a shaft part which is configured to pass through the locking hole and the seat cushion frame and then be integrally coupled to a lower end of the buckle;
   a lock gear arranged on an outer surface of the pole bracket as an external gear;
   a patch bracket fixedly coupled to one surface of the seat cushion frame, which is disposed to face the sector gear bracket; and
   a guide hole, through which the shaft part passes, extending through the seat cushion frame and the patch bracket,
   wherein, when the shaft part is coupled to the buckle, the lock gear is configured to be disposed in the locking hole and configured to move in the locking hole in a diagonal direction due to a load applied to the buckle so as to be engaged with or disengaged from the sector gear.

2. The locking apparatus according to claim 1, wherein the guide hole has a shape of a slit oriented in a diagonal direction in which the load is applied to the buckle.

3. The locking apparatus according to claim 1, wherein, when the shaft part moves upwards along the guide hole due to the load applied to the buckle, the lock gear is engaged with the sector gear, and
   wherein, when the shaft part moves downwards along the guide hole, the lock gear is disengaged from the sector gear.

4. The locking apparatus according to claim 1, further comprising:
- a rail bracket to which a front end of the sector gear bracket is rotatably coupled by a hinge pin; and
- a seat rail to which the rail bracket is fixedly coupled,
- wherein, when a collision occurs, the load applied to the buckle is transmitted to a vehicle body through the sector gear bracket, the hinge pin, the rail bracket and the seat rail.

5. The locking apparatus according to claim 1, wherein the seat cushion frame and the seat rail are connected by a plurality of rotatable links,
- wherein, when the seat cushion frame and the rear pipe vertically move with respect to the seat rail, the seat cushion frame vertically moves due to rotation of the rotatable links so that a height of the seat cushion frame is adjusted, and
- wherein, when the seat cushion frame vertically moves, the buckle connected to the seat cushion frame vertically moves together with the seat cushion frame.

6. The locking apparatus according to claim 1, wherein, when the lower end of the buckle and the shaft part of the pole bracket are coupled to each other, a spring bracket is integrally coupled thereto,
- wherein the locking apparatus further comprises a return spring having one end supported by the spring bracket and another end supported by the seat cushion frame, and
- wherein the return spring is configured to transmit a spring force to the spring bracket such that the lock gear is spaced apart from the sector gear so as to release engagement between the lock gear and the sector gear.

7. The locking apparatus according to claim 1, further comprising:
- a bolt part configured to protrude towards the pole bracket on the patch bracket; and
- a bracket hole, through which the bolt part passes, defined in the pole bracket in a same diagonal direction as the guide hole,
- wherein, a pole nut is coupled to the bolt part having passed through the bracket hole, such that when the shaft part moves along the guide hole by the load applied to the buckle, torsion of the pole bracket is prevented.

8. The locking apparatus according to claim 1, wherein the buckle of the seat belt is connected to the seat cushion frame and the seat rail by the locking apparatus.

* * * * *